Jan. 10, 1939.　　　G. E. HALLENBECK　　　2,143,241
INSTRUMENT OF PRECISION
Filed July 17, 1935
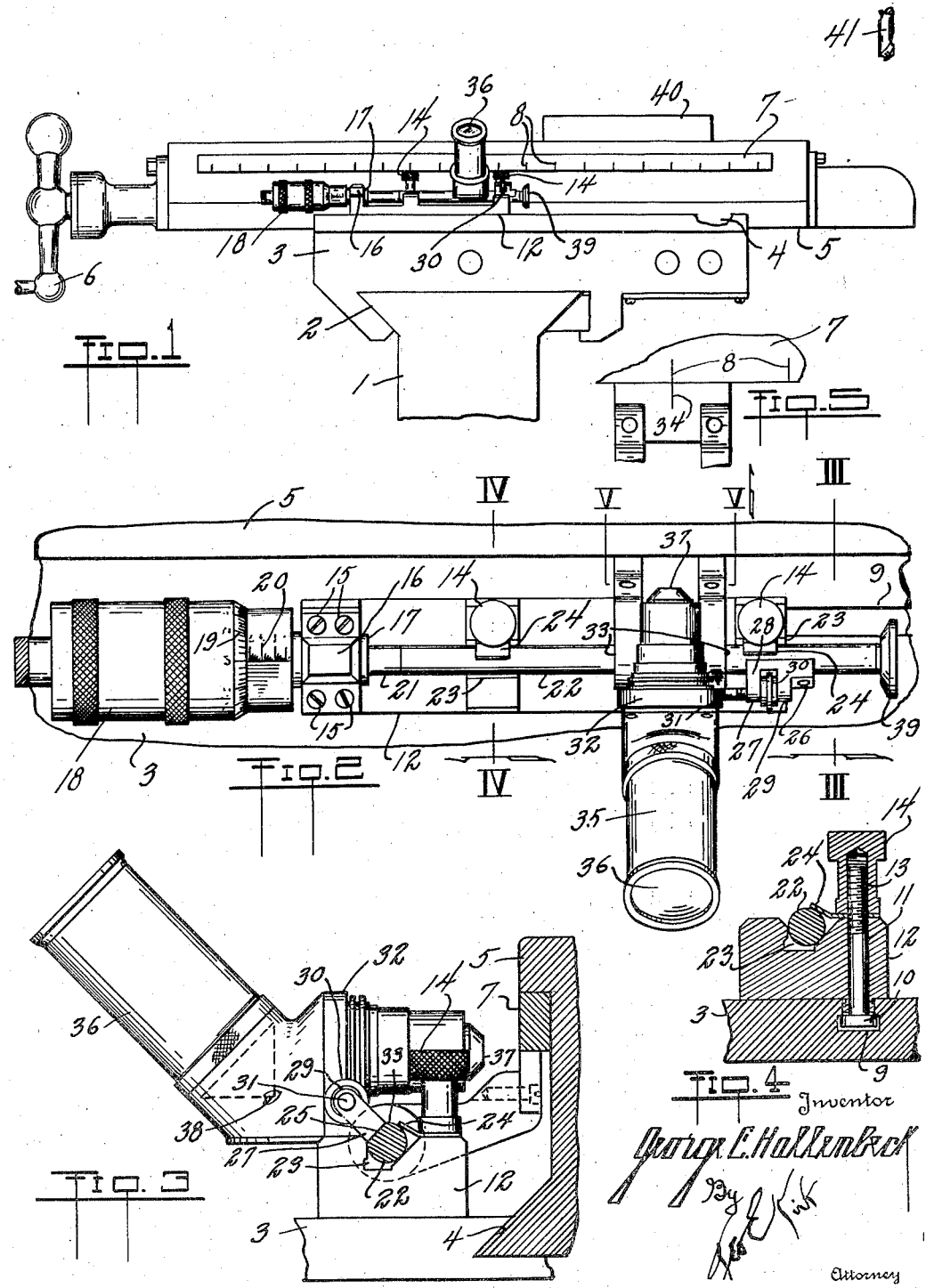

Patented Jan. 10, 1939

2,143,241

UNITED STATES PATENT OFFICE 2,143,241

INSTRUMENT OF PRECISION

George E. Hallenbeck, Toledo, Ohio, assignor to Baker Brothers, Inc., Toledo, Ohio, a corporation of Ohio Application July 17, 1935, Serial No. 31,807

5 Claims. (Cl. 33—125)

This invention relates to dimension-determining or checking in the use of instruments of precision.

This invention has utility when incorporated in conjunction with scales or graduations in co-operative association for inter-relation.

Referring to the drawing:

Fig. 1 is a view of a machine bed of a metal working tool such as a drill press which carries a device having an embodiment of the invention therewith;

Fig. 2 is a plan view of the device of Fig. 1, parts being broken away;

Fig. 3 is a section on the line III—III, Fig. 2;

Fig. 4 is a section on the line IV—IV, Fig. 2; and

Fig. 5 is a section on the line V—V, Fig. 2.

A standard 1 of this machine tool is shown having a way 2 carrying a primary table section or member 3. This primary table section 3 has a way 4 mounting a secondary table section or member 5. This secondary table section 5 may be moved as to the primary table 3 by rotating a hand wheel 6 and thus effecting the desired longitudinal shifting of the secondary table 5 as to the way 4. On this secondary table 5 is mounted a scale 7 having graduations 8.

The primary table section 3 in parallel with the way 4 has a way 9 which may be engaged by heads 10 of bolts 11 extending through a block 12. Each bolt 11, as protruding through the block 12, has a threaded portion 13 engaged by a nut 14. This block 12 is thus anchored in a desired position along the primary table 3 as to the scale device 7 on the mounting 5. This block 12 has screws 15 mounting a pillow block 16 as a bearing for a sleeve 17, thus sustaining a measuring instrument 18 in operative position with respect to the block 12.

This instrument 18 on the additional mounting 3 is shown with cylindrical series of graduations 19 in the form of a rotary scale of notations as to a lineally extending second scale of notations at an index 20 in determining an adjustment for a plunger 21 in its protrusion from the sleeve 17 discloses a distance limit, gage means, or stop to abut bar 22 in an angular way 23, and retained from snapping out thereof by leaf springs 24 on the bolts 11. This bar 22 has a flattened side portion 25 (Fig. 3), against which is mounted by screws 26, a minor block 27 having a pair of ears 28, 29, between which is disposed a nut 30. The screws 26 are threaded in the bar 22 and protrude to engage and hold the block 27. Through these ears 28, 29, extends a bolt 31 engaging in a ring 32 for adjusting the bar 22 as to the eye piece or optical instrument. This ring 32 has a pair of eyes 33 therefrom extending about the bar 22.

From these eyes 33 and fixed with the additional mounting 3 is an extension mounting a block carrying a mark or index line 34 (Fig. 5) at the scale 7. The ring 32 provides a mounting for an adjustable microscope 35 having an eye piece 36, an objective 37, and a refractor 38 therebetween to bend the ray so that one looking into the eye piece from a standing position may check registration of the index or mark line 34 with a gage means or graduation 8 on the scale 7. The bar 22 has a limit or distance-determining head 39. An article of work 40 is to be positioned as to a tool 41, say as a drill or bit. In effecting such setting of the mounting or table section 5 for an article of work, it is desirable to locate the microscope and measuring instrument unit in a minus relation as to the last full unit or fractional unit of the scale 7.

In the practice hereunder, there may be latitude followed as convenience to the user or operator. However, a simple effective course to adopt is to locate the work 40 in fixed position on a machine tool member as a table, bringing the tool 41 into position for initiating the work and in contact with the work 40. At such position, the index line or mark 34 may be brought into registry with a graduation 8 on the scale 7, say to graduation 2 on the scale 7 and with the plunger 21 in position to abut the bar 22 and the notation on the cylindrical scale 19 and lineal scale 20 each at 0 say for inches. For instance hereunder, these graduations 8 are considered primary or first scale and the instrument as secondary dimension or secondary scale of graduations. Assuming the quantity dimension desired is 6.137 inches, the release nuts 14 permit shifting of the index 34 and the bar 22 as to the plunger or secondary stop 21. The instrument 18 is adjusted for the scales 19, 20, to bring the plunger 21 to .863 inch. The bar 22 may be brought then to abut the plunger 21, or the plunger 21 allowed to come against the bar 22 held by the abutment 39 in providing the primary stop or location as predetermined. This latter may be the procedure during the operation or traverse effected by the machine to bring the member 3 with the instrument 18 into such position as to the member 5 that the observer may have the index 34 in sight to check a reading through the lens system 36 for the desired register therewith of a graduation 8 on the scale 7. Such position to which the index 34 and the bar 22 have been shifted, in this practice may be less than a total unit on the scale 7 away from the total traverse to be undertaken. In either event, for the sought total 6.137 and with the starting reading 2, then the traverse proceeding is for the index 34 to come to graduation 9 in the scale 7. In this operation of traverse, there of course first occurs the transit of the minor or fractional dimension from the second scale .137, the part of the total measured on the second scale. Then the full units on the graduations 8 on the scale 7 are in sequence to continue from the reading or graduation 3, now functioning to bring in the six full units therebeyond. Accordingly, this continuation of the traverse is to bring the index 34 to readily visible graduation 9 on the scale 7. This makes the effective traverse between the tool and work of 6.137 inches, and the observation is checked where the graduations 8 are relatively sparse on the scale 7 for ready observance and minute accuracy of dimension. This register on the open scale 7 is cumulative of secondary scale markings of the instrument. In practice, this is helpful against trouble from personal error by the worker, even in close or narrow limits of tolerance as for inspection, in jig work, and other locations where precision is of importance.

What is claimed and it is desired to secure by Letters Patent is:

1. For ready close dimension visibility, a first scale, a first mounting therefor, an index shiftable relatively to the first scale, a second scale, adjusted means shiftable to position determined by said second scale, a second mounting for the adjusted means and index, and traverse-effecting means between the mountings for relative transit of the index, adjusted means and second scale as a unit as to the first scale.

2. For ready close dimension visibility, a first scale, an index shiftable relatively to the first scale, a bar fixed with the index, a second scale, adjusted means shiftable into position determined by the second scale, a block mounting the bar and adjusted means, and machine tool relatively shiftable members, one mounting the first scale, and the other mounting the block carrying the index.

3. For ready close dimension visibility, a first mounting, a first scale thereon, an additional mounting slidably carrying the first mounting, means on said additional mounting shiftable along said first scale parallel thereto, an index carried by said means and shiftable relatively to said means along and adjacent said first scale, a second scale device on said means for positioning said index relatively to said means, an optical instrument on said means for viewing said index, and mechanism for effecting relative shifting between said mountings.

4. For ready close dimension visibility, a first mounting, a first scale thereon, an additional mounting slidably carrying the first mounting, means on said additional mounting shiftable along said first scale parallel thereto, an index carried by said means and shiftable relatively to said means along and adjacent said first scale, a second scale device on said means for positioning said index relatively to said means, an optical instrument on said means for viewing said index, and mechanism for effecting relative shifting between said mountings, said means including a bar carrying the instrument and a mounting block for the bar as to which the bar is movable.

5. For ready close dimension visibility, first gage means, a mounting therefor, an index shiftable relatively to the first gage means, second gage means, an additional mounting movable relatively to the first gage means for mounting the second gage means and index, fixed position locating means adapted to be disclosed by the second gage means, an eye piece instrument for observation of the index, said instrument being fixed with the index and carried by the additional mounting, and traverse means for effecting relative transit of the index, instrument, positioning means and second gage means as a unit relatively to the first gage means.

GEO. E. HALLENBECK.